(12) United States Patent
Heo

(10) Patent No.: US 10,681,354 B2
(45) Date of Patent: Jun. 9, 2020

(54) IMAGE ENCODING/DECODING METHOD AND APPARATUS THEREFOR

(71) Applicant: LG ELECTRONICS INC., Seoul (KR)

(72) Inventor: Jin Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/466,579

(22) PCT Filed: Dec. 5, 2016

(86) PCT No.: PCT/KR2016/014171
§ 371 (c)(1),
(2) Date: Jun. 4, 2019

(87) PCT Pub. No.: WO2018/105759
PCT Pub. Date: Jun. 14, 2018

(65) Prior Publication Data
US 2019/0394471 A1    Dec. 26, 2019

(51) Int. Cl.
*H04N 11/02*    (2006.01)
*H04N 19/159*    (2014.01)
(Continued)

(52) U.S. Cl.
CPC ......... *H04N 19/159* (2014.11); *H04N 19/105* (2014.11); *H04N 19/124* (2014.11); *H04N 19/13* (2014.11)

(58) Field of Classification Search
CPC .................................................. H04N 19/159
(Continued)

(56) References Cited

U.S. PATENT DOCUMENTS 8,767,817 B1 *  7/2014  Xu ....................... H04N 19/105
                                                          375/240
8,798,131 B1 *  8/2014  Bankoski ............. H04N 19/176
                                                          375/240
(Continued)

FOREIGN PATENT DOCUMENTS

KR    10-2010-0113981 A    10/2010
KR    10-2014-0088061 A    7/2014
(Continued)

*Primary Examiner* — Leron Beck
(74) *Attorney, Agent, or Firm* — Dentons US LLP

(57) ABSTRACT

A method for encoding/decoding an image and a device therefor are disclosed. Specifically, the method for decoding the image by the decoding device, the method includes deriving an intra prediction mode of a current block, constructing reference samples with samples adjacent to an top of the current block and samples adjacent to a left of the current block, and generating a prediction sample, when the intra prediction mode is a vertical/horizontal strong mode, using a reference sample having the same x-coordinate as the sample, a reference sample having the same y-coordinate as the sample, a reference sample adjacent to a bottom-left of the current block, and a reference sample adjacent to an top-right of the current block among the reference samples for each sample in the current block, wherein a weighting value w1 applied to the reference sample having the same y-coordinate as the sample and the reference sample adjacent to the top-right of the current block and a weighting value w2 applied to the reference sample having the same x-coordinate as the sample and the reference sample adjacent to the bottom-left of the current block are set to be different from each other.

9 Claims, 15 Drawing Sheets

(51) Int. Cl.
*H04N 19/105* (2014.01)
*H04N 19/124* (2014.01)
*H04N 19/13* (2014.01)

(58) Field of Classification Search
USPC .................................... 375/240.01–240.29
See application file for complete search history.

(56) References Cited

U.S. PATENT DOCUMENTS

| | | | | |
|---|---|---|---|---|
| 2005/0063466 A1* | 3/2005 | Etoh | .................... | H04N 9/8042 |
| | | | | 375/240.16 |
| 2011/0158315 A1* | 6/2011 | Kim | ..................... | H04N 19/124 |
| | | | | 375/240.03 |
| 2012/0269263 A1* | 10/2012 | Bordes | ................. | H04N 19/105 |
| | | | | 375/240.03 |
| 2013/0136175 A1* | 5/2013 | Wang | ................... | H04N 19/176 |
| | | | | 375/240.12 |
| 2015/0124876 A1* | 5/2015 | Lee | ........................ | H04N 19/44 |
| | | | | 375/240.12 |
| 2015/0172724 A1* | 6/2015 | Minezawa | ........... | H04N 19/117 |
| | | | | 375/240.02 |
| 2015/0334389 A1* | 11/2015 | Sato | ..................... | H04N 19/103 |
| | | | | 375/240.16 |
| 2017/0230673 A1* | 8/2017 | He | ....................... | H04N 19/176 |

FOREIGN PATENT DOCUMENTS

| | | |
|---|---|---|
| KR | 10-1564422 B1 | 10/2015 |
| KR | 10-2015-0140848 A | 12/2015 |
| KR | 10-2016-0014082 A | 2/2016 |

* cited by examiner

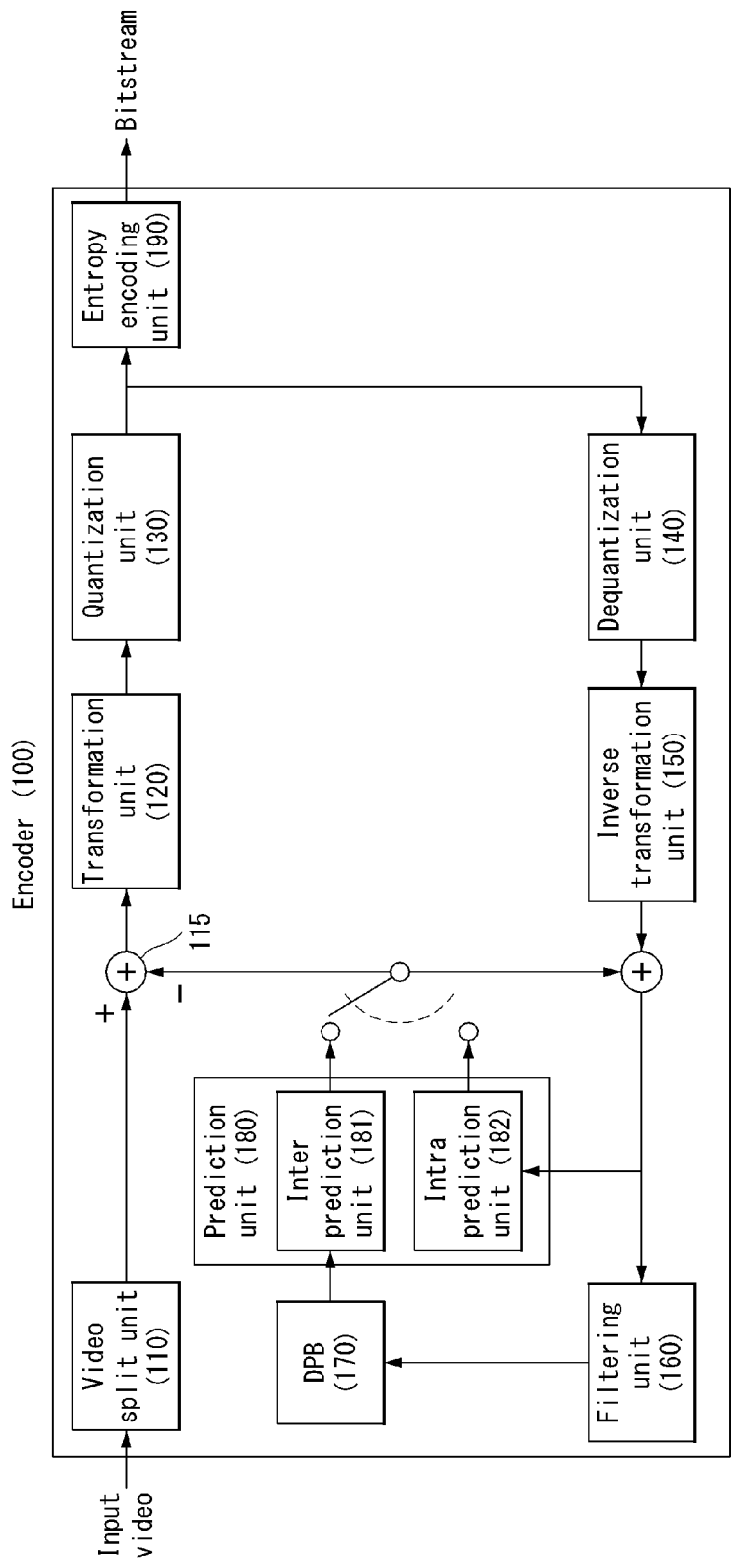
[FIG. 1]

[FIG. 2]
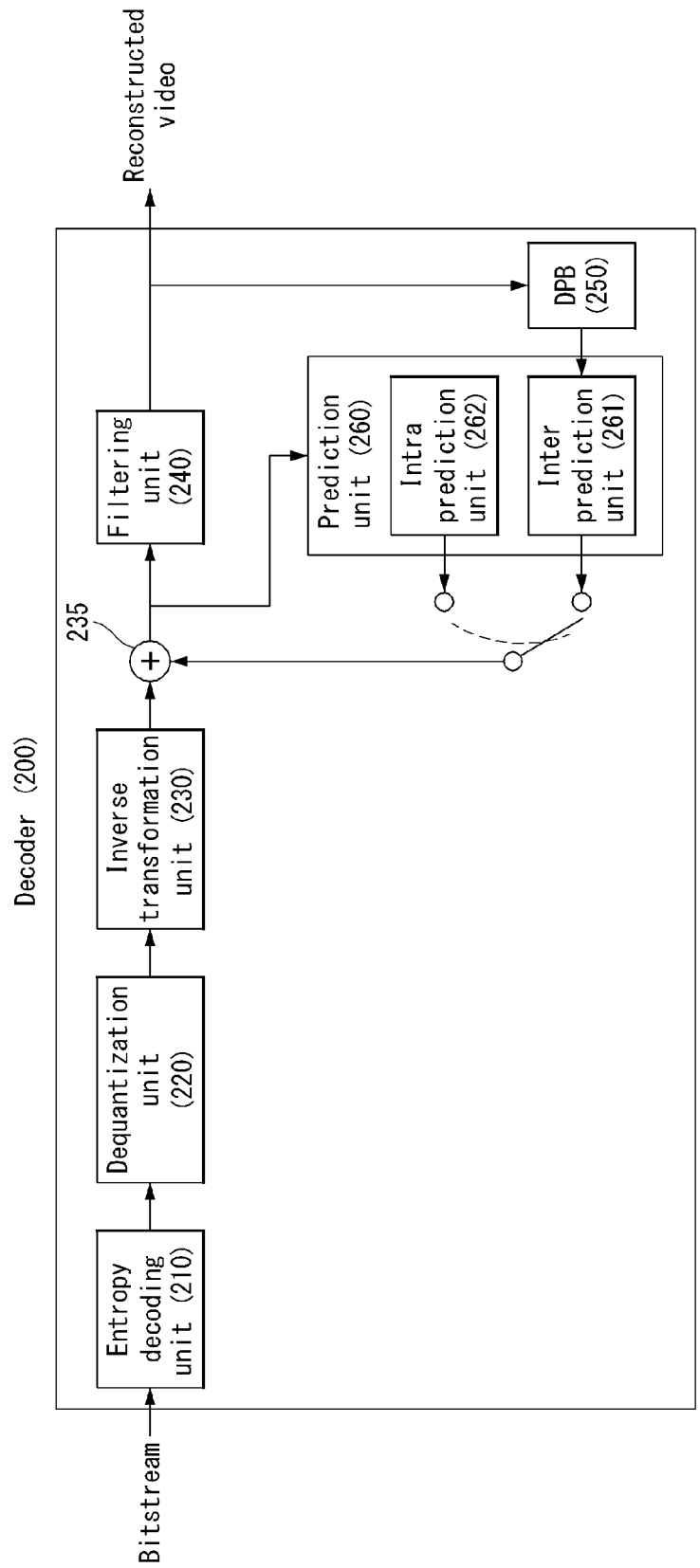

[FIG. 3]
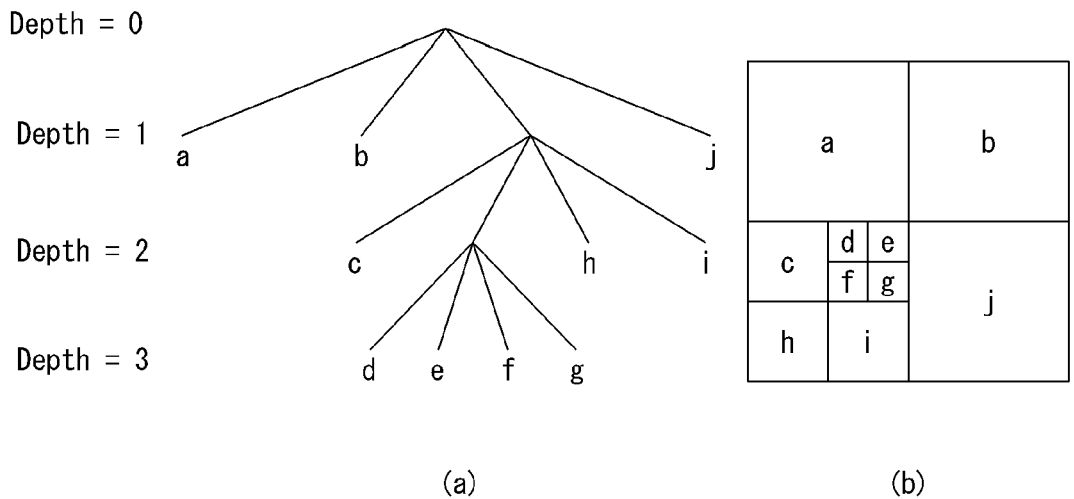
(a)                    (b)
[FIG. 4]
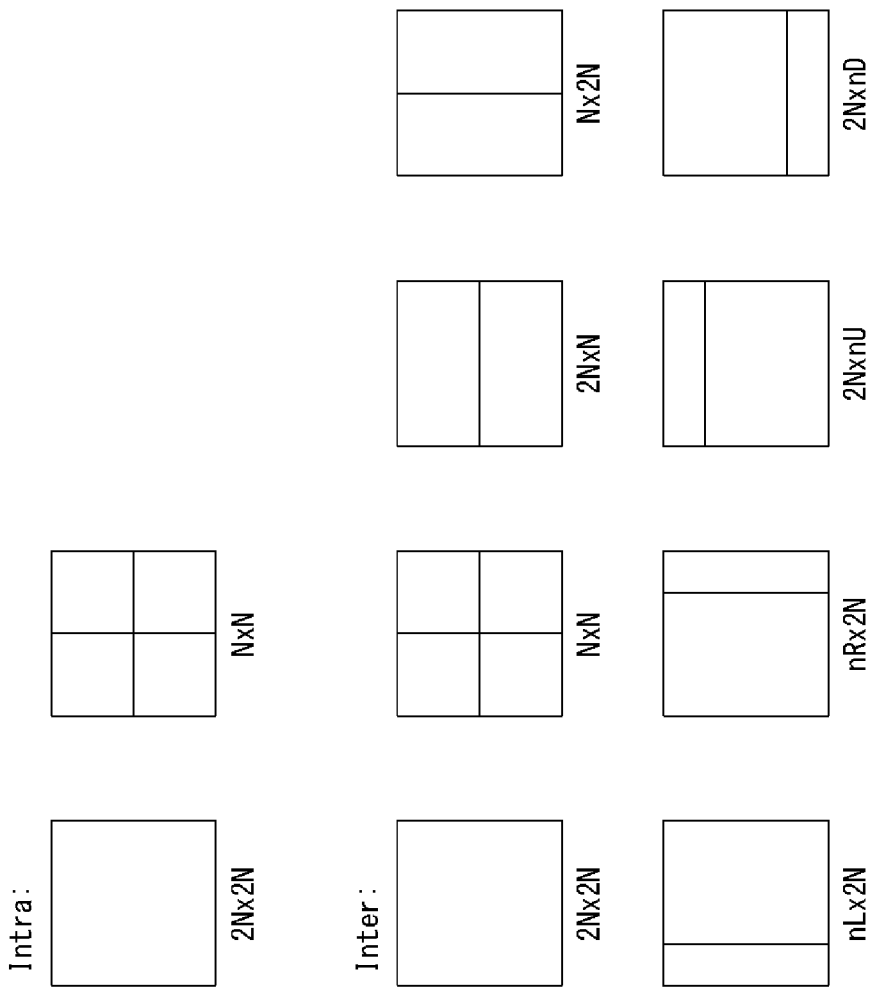

【FIG. 5】
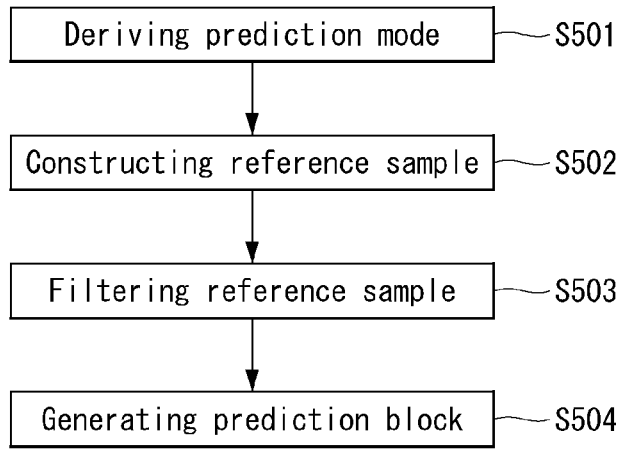
【FIG. 6】
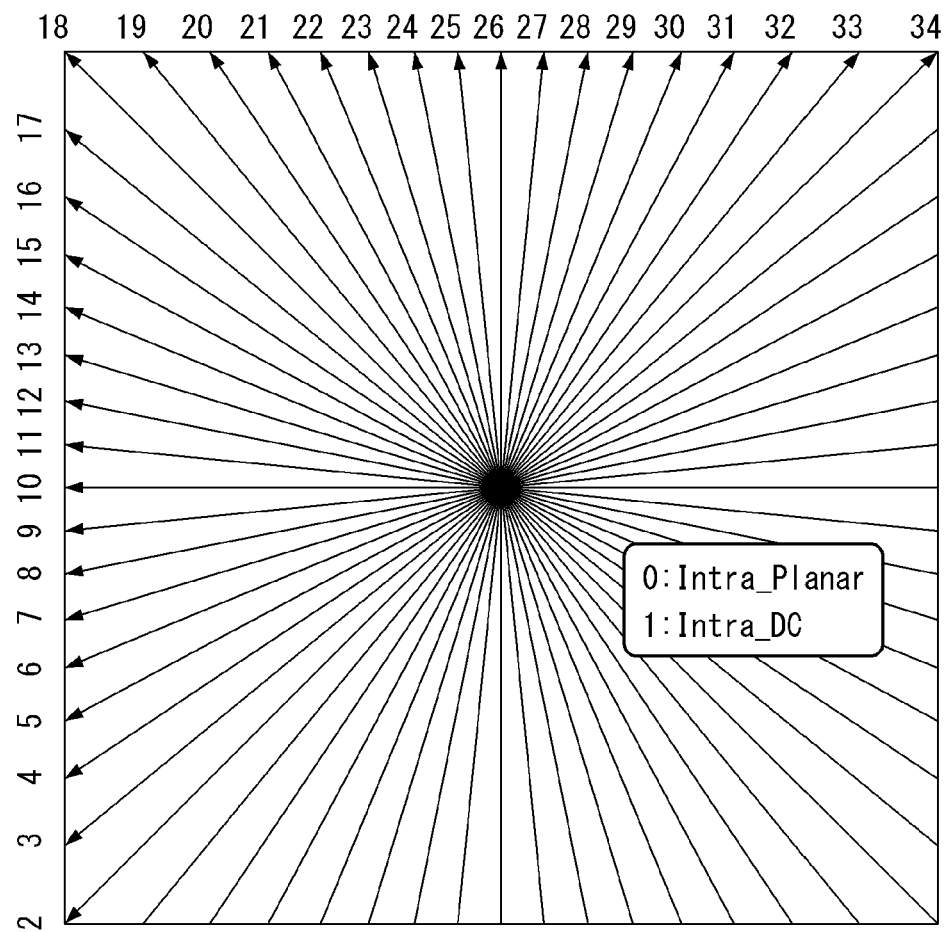

[FIG. 7]
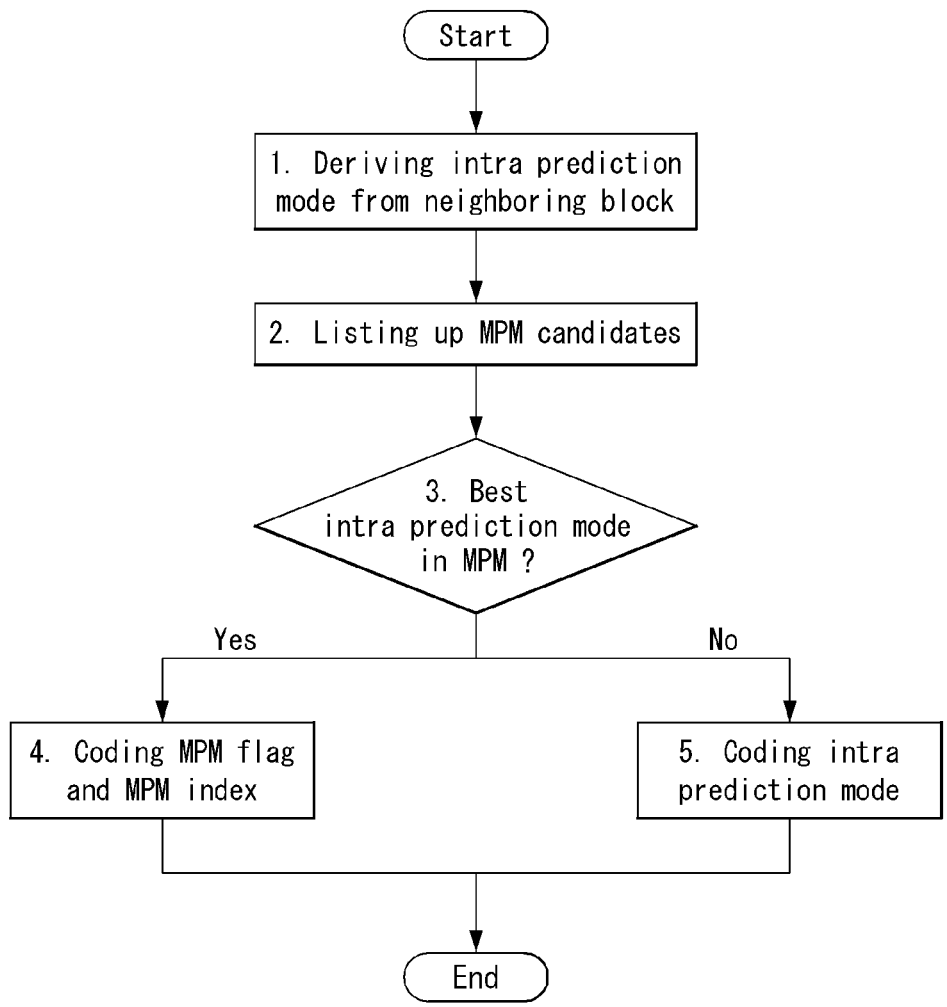

[FIG. 8]
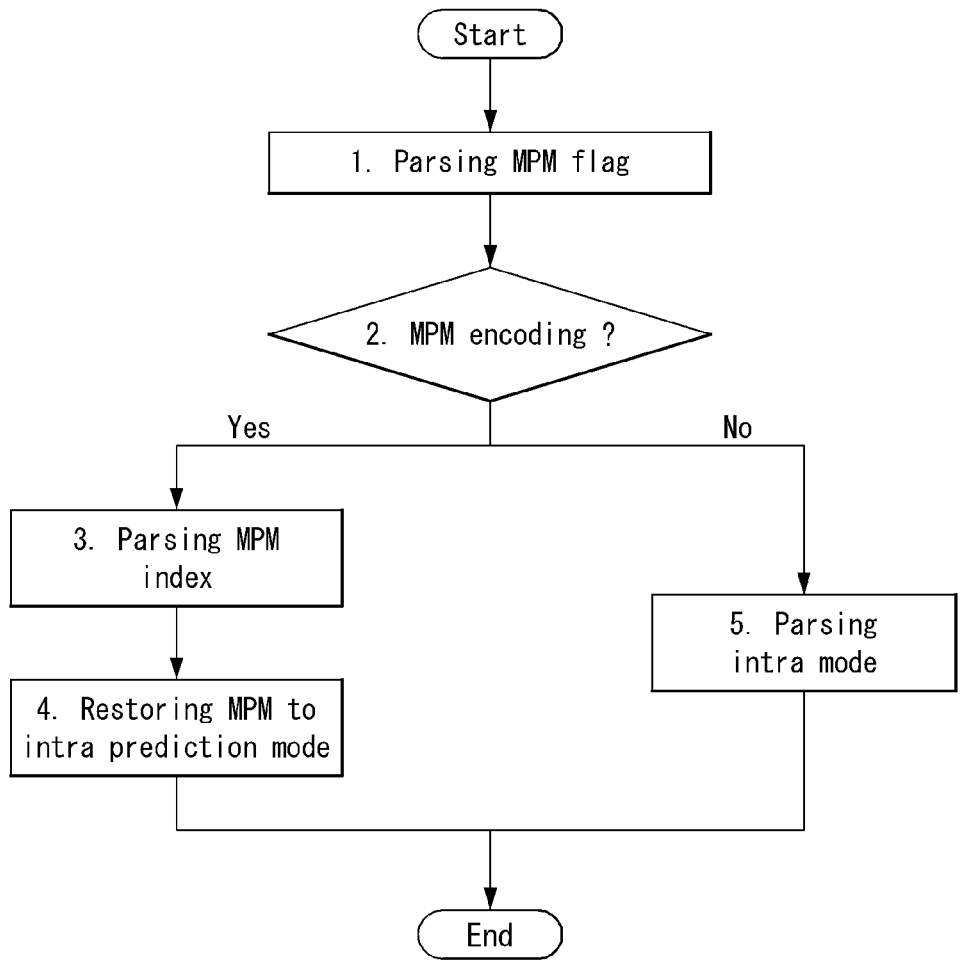

[FIG. 9]
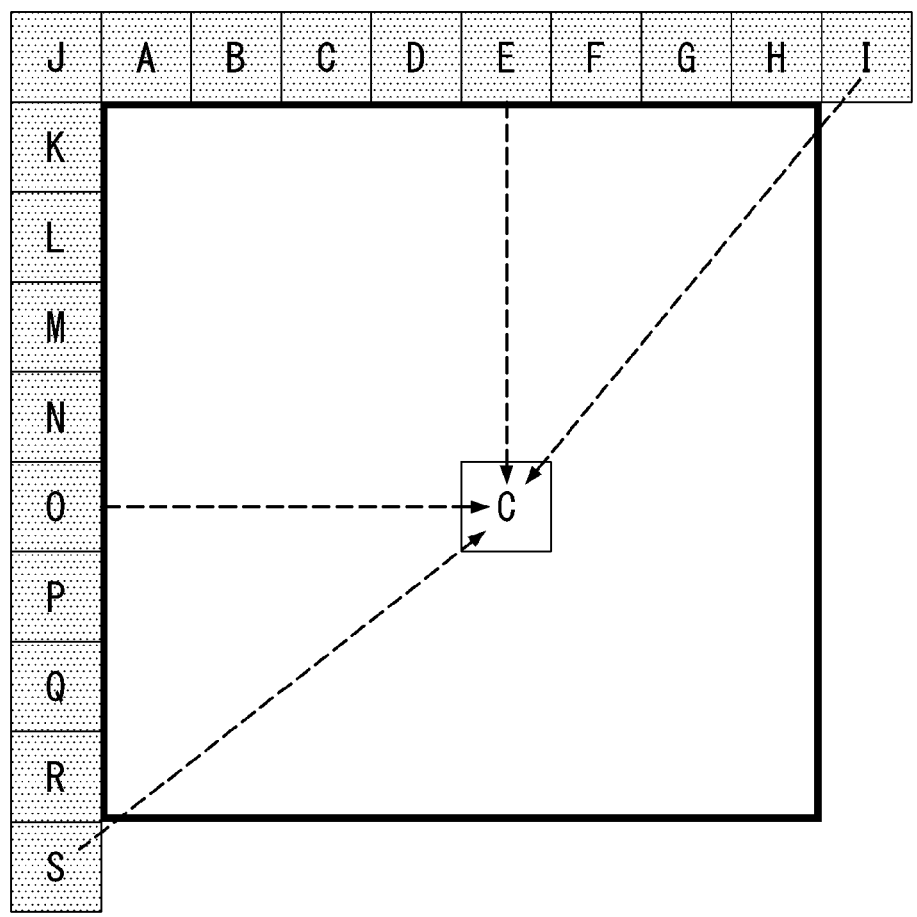

[FIG. 10]
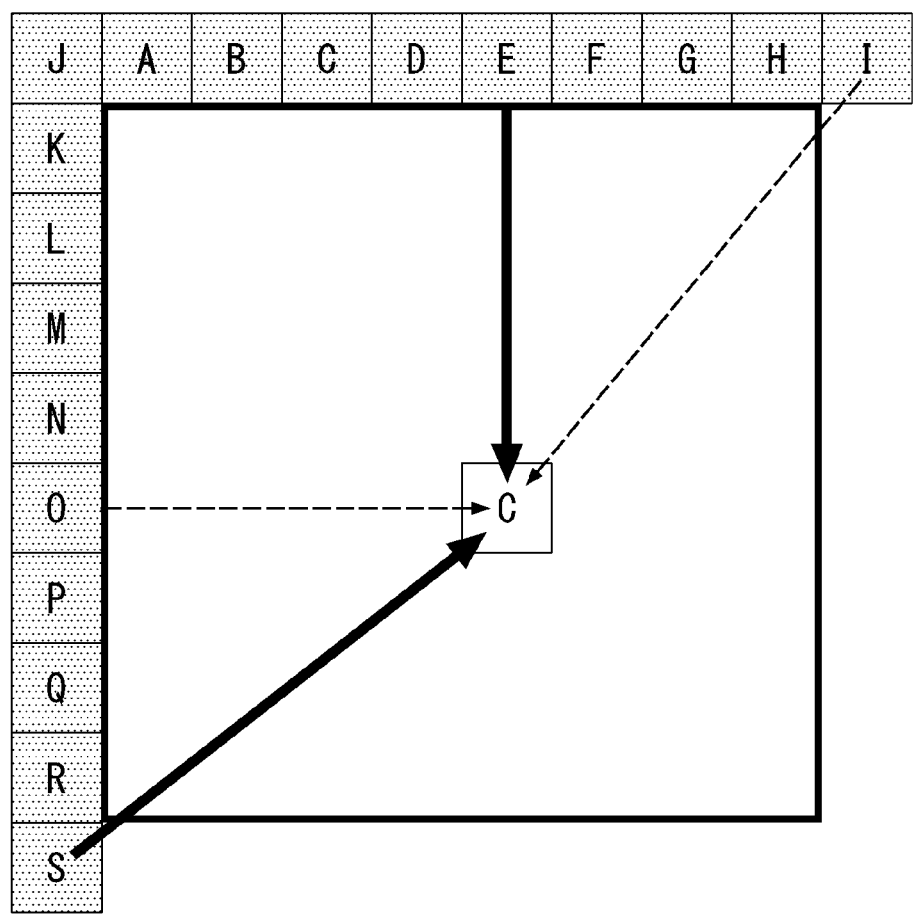

[FIG. 11]
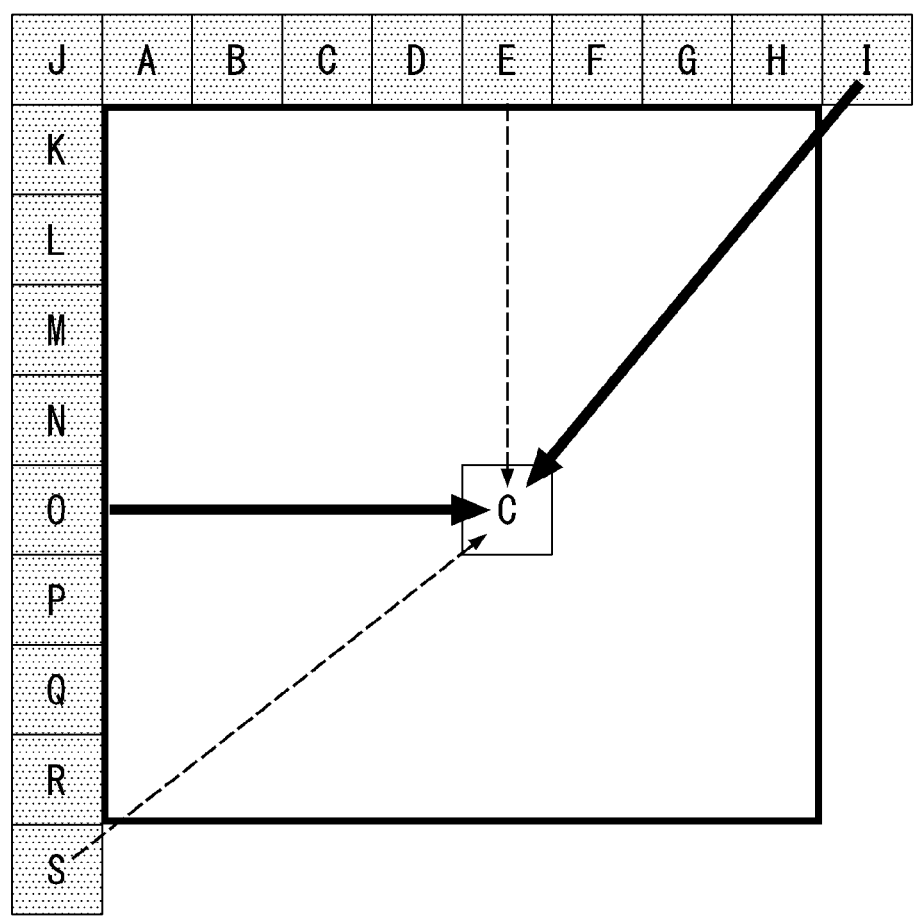

[FIG. 12]
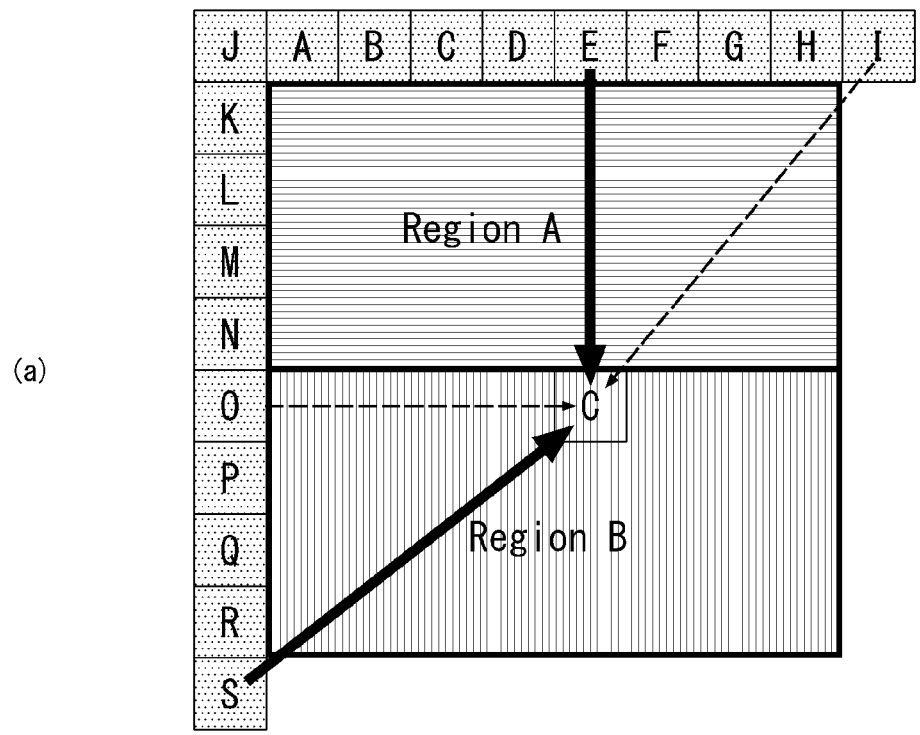
(a)
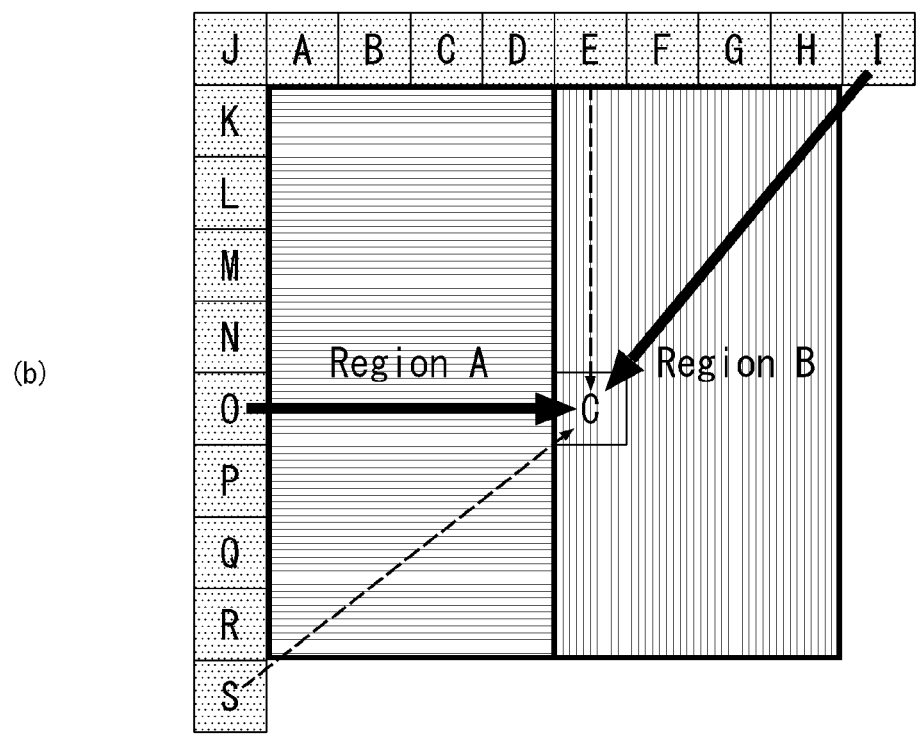
(b)

[FIG. 13]
(a)
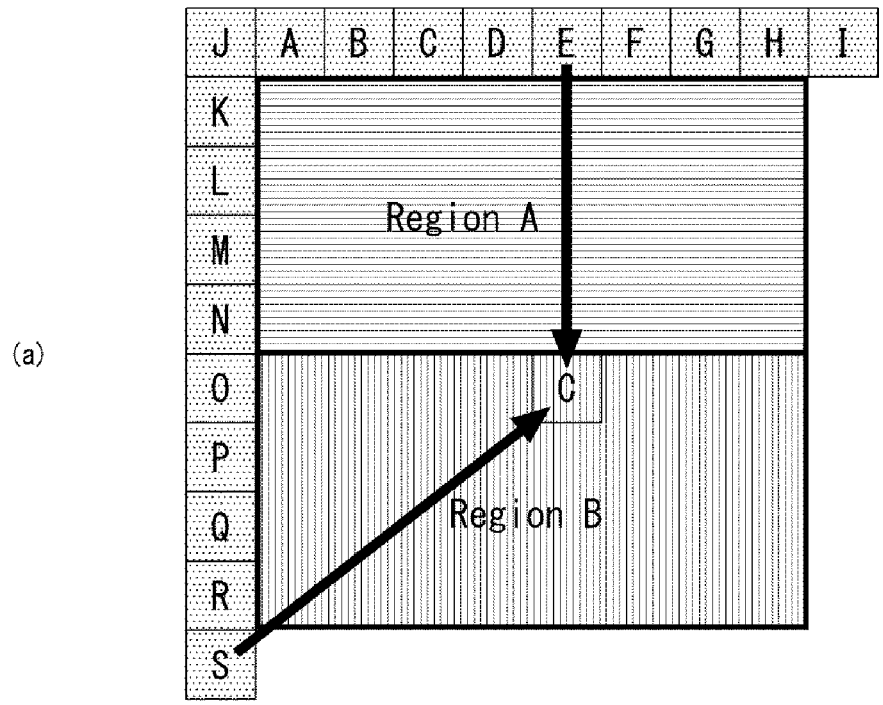
Determining weighting value w2 related to top reference samples
(b)
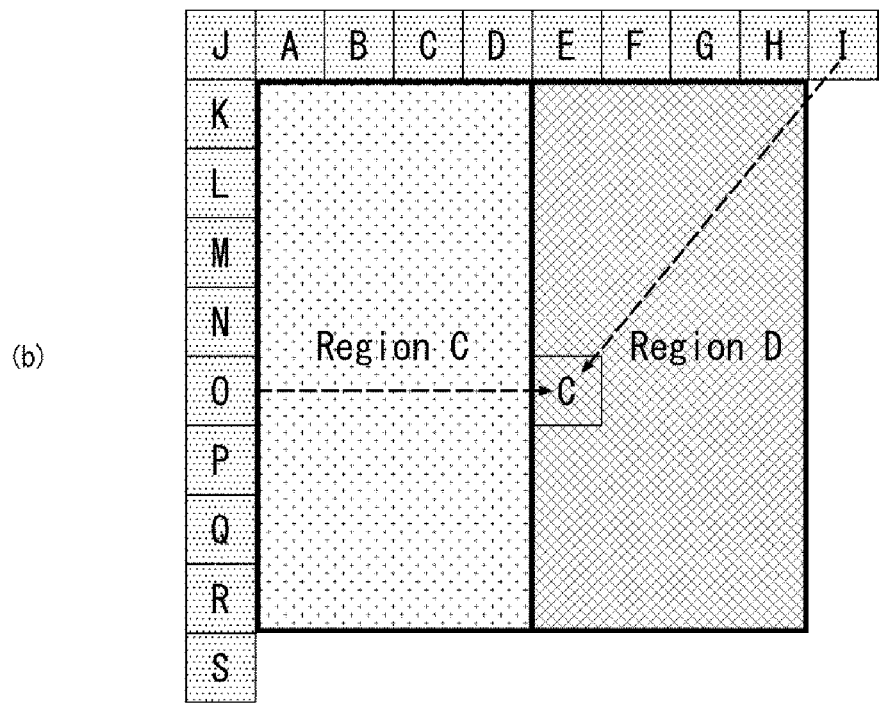
Determining weighting value w1 related to left reference samples

[FIG. 14]
(a)
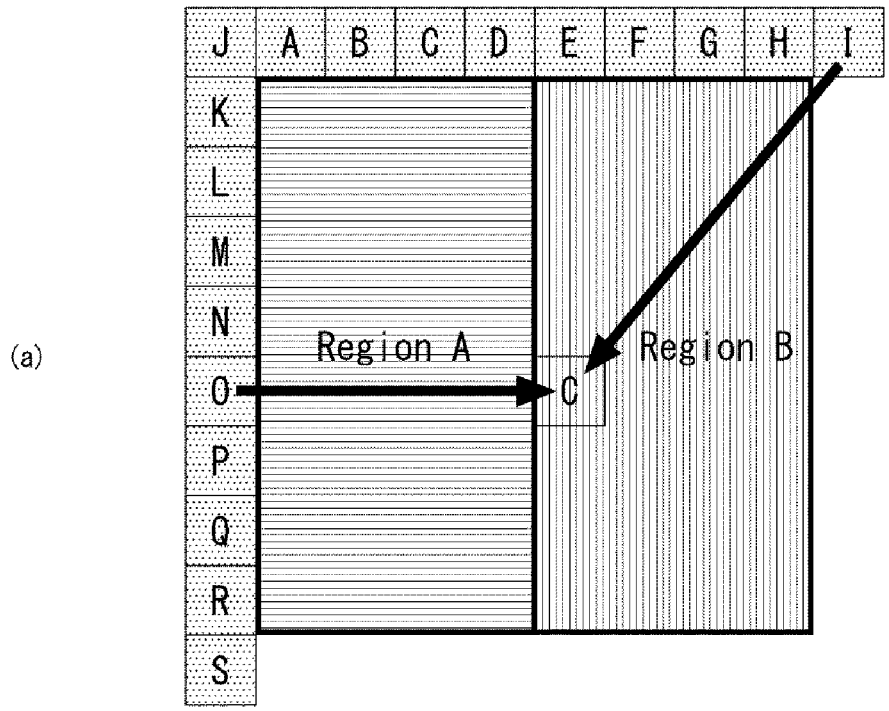
Determining weighting value w1 related to left reference samples
(b)
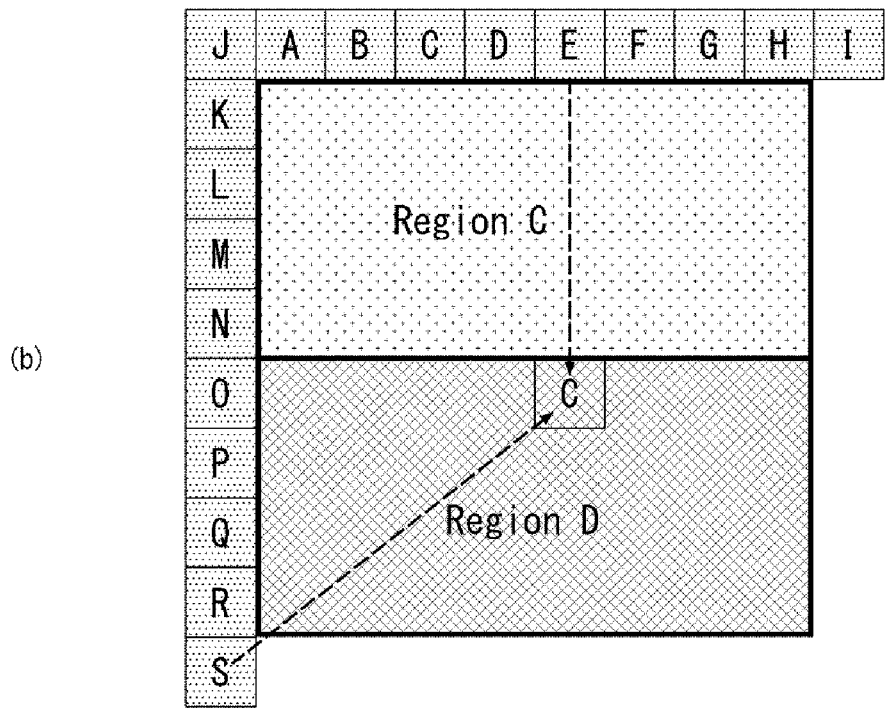
Determining weighting value w2 related to top reference samples

[FIG. 15]
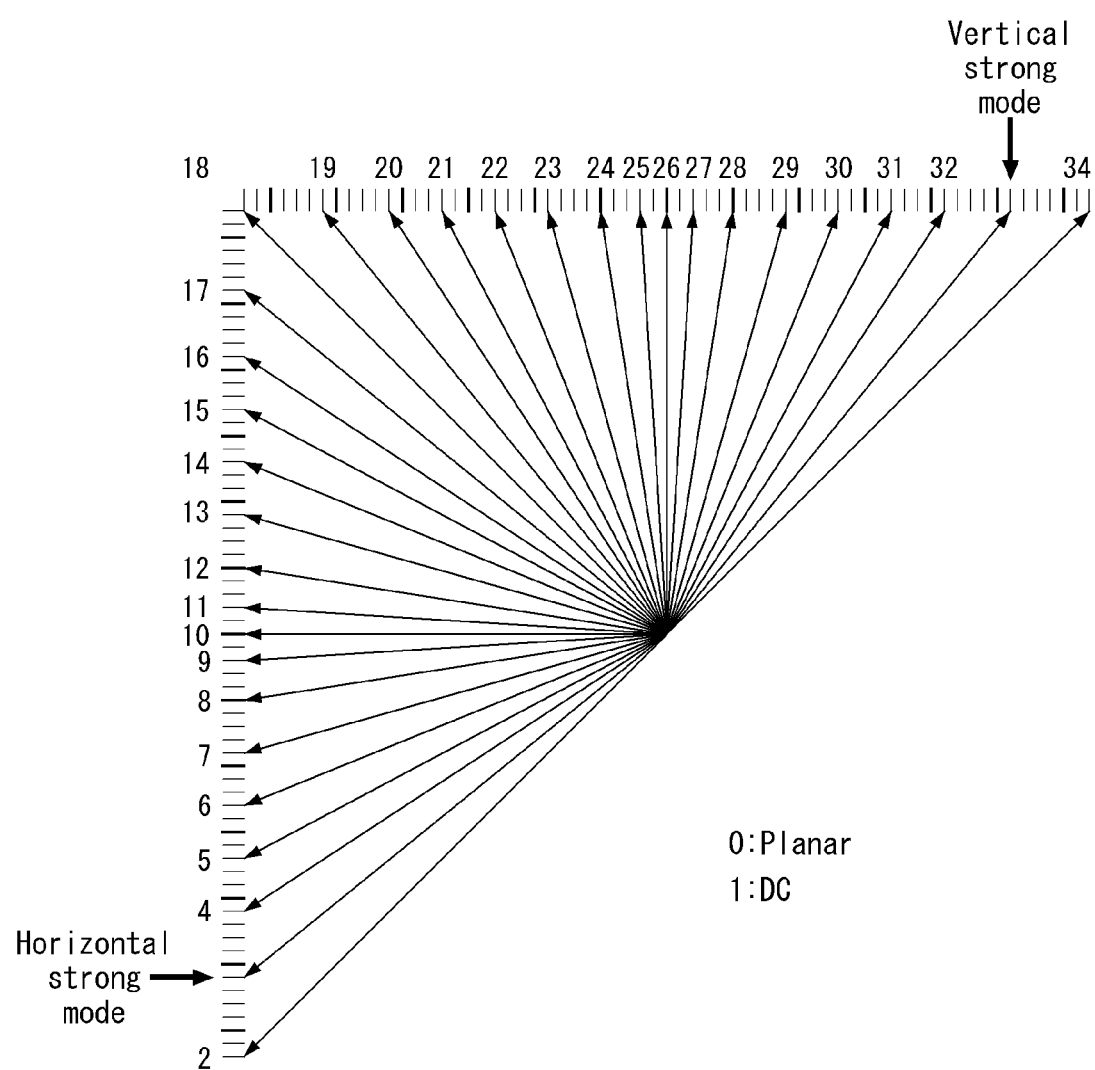

[FIG. 16]
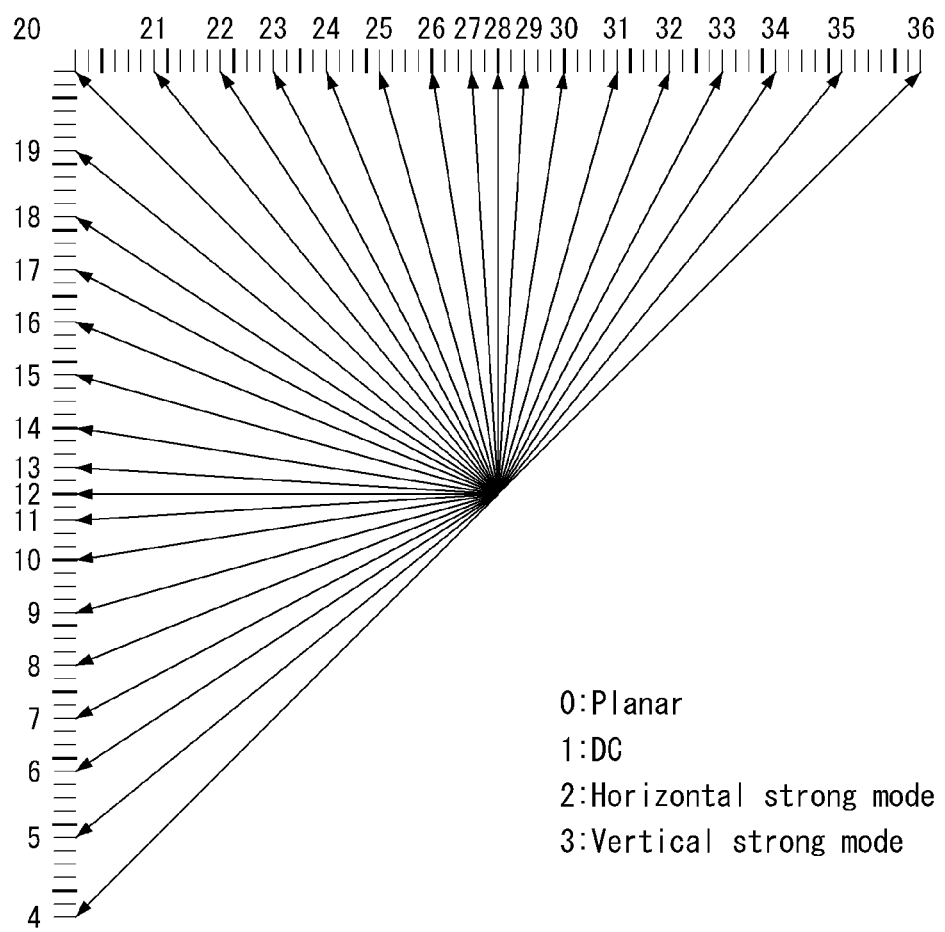
0:Planar
1:DC
2:Horizontal strong mode
3:Vertical strong mode

[FIG. 17]
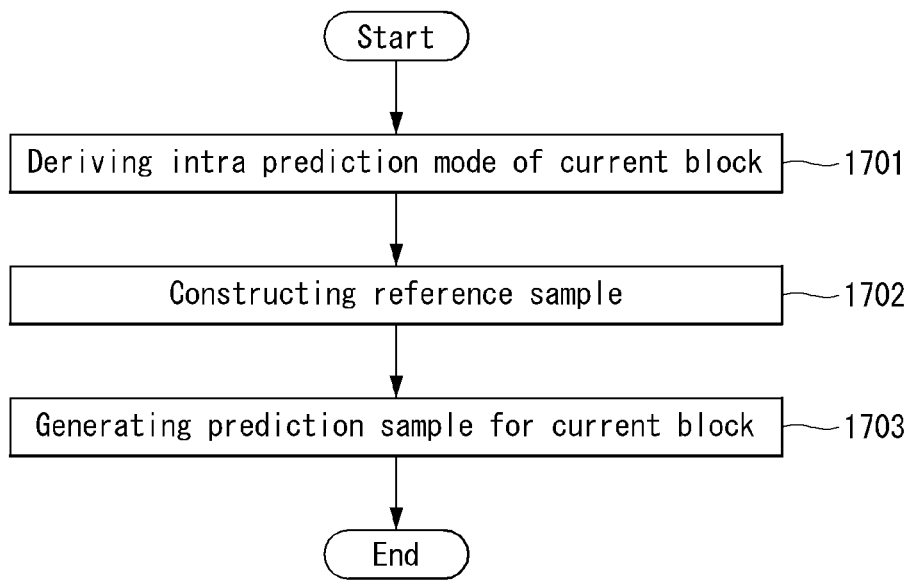
[FIG. 18]
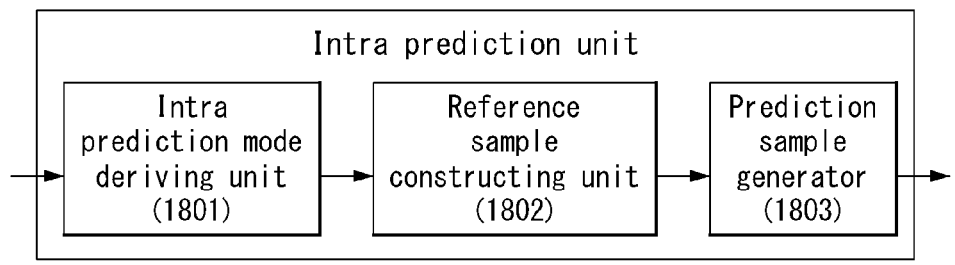

IMAGE ENCODING/DECODING METHOD AND APPARATUS THEREFOR

CROSS-REFERENCE TO RELATED APPLICATIONS

This application is the National Stage filing under 35 U.S.C. 371 of International Application No. PCT/KR2016/014171, filed on Dec. 5, 2016, the contents of which are all hereby incorporated by reference herein in their entirety.

TECHNICAL FIELD

The present invention relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DETAILED DESCRIPTION OF INVENTION

Technical Problem

In an existing intra-picture prediction method, since a directional prediction method uses limited reference samples, a local prediction block is generated, and since a non-directional prediction method, although all neighboring reference samples adjacent to the current block are used, generates a prediction block with an average value and a general weighting value, there is a problem that characteristics of the neighboring reference sample are not reflected.

An object of the present invention is to propose an intra-picture prediction method for generating a prediction block by reflecting stronger characteristics to a horizontal direction or a vertical direction in an existing planar mode to solve the above problems.

The objects of the present invention are not limited to the technical objects described above, and other technical that are objects not mentioned herein may be understood to those skilled in the art from the description below.

Technical Solution

In one aspect of the present disclosure, a method for decoding an image by a decoding device, the method includes deriving an intra prediction mode of a current block, constructing reference samples with samples adjacent to an top of the current block and samples adjacent to a left of the current block, and generating a prediction sample, when the intra prediction mode is a vertical/horizontal strong mode, using a reference sample having the same x-coordinate as the sample, a reference sample having the same y-coordinate as the sample, a reference sample adjacent to a bottom-left of the current block, and a reference sample adjacent to an top-right of the current block among the reference samples for each sample in the current block, wherein a weighting value w1 applied to the reference sample having the same y-coordinate as the sample and the reference sample adjacent to the top-right of the current block and a weighting value w2 applied to the reference sample having the same x-coordinate as the sample and the reference sample adjacent to the bottom-left of the current block are set to be different from each other.

In another aspect of the present disclosure, a decoding device for decoding an image, the device includes an intra prediction mode deriving unit configured to derive an intra prediction mode of a current block, a reference sample constructing unit configured to construct reference samples with samples adjacent to an top of the current block and samples adjacent to a left of the current block, and a prediction sample generator configured to generate a prediction sample, when the intra prediction mode is a vertical/horizontal strong mode, using a reference sample having the same x-coordinate as the sample, a reference sample having the same y-coordinate as the sample, a reference sample adjacent to a bottom-left of the current block, and a reference sample adjacent to an top-right of the current block among the reference samples for each sample in the current block, wherein a weighting value w1 applied to the reference sample having the same y-coordinate as the sample and the reference sample adjacent to the top-right of the current block and a weighting value w2 applied to the reference sample having the same x-coordinate as the sample and the reference sample adjacent to the bottom-left of the current block are set to be different from each other.

Preferably, when the intra prediction mode is the horizontal strong mode, the w1 may be set to be larger than the w2.

Preferably, wherein when the intra prediction mode is the vertical strong mode, the w2 may be set to be larger than the w1.

Preferably, wherein the w1 and the w2 may be set to the same value for all samples in the current block.

Preferably, the w1 may be set to be smaller as a distance between a sample in the current block and the samples adjacent to the left of the current increases.

Preferably, the w2 may be set to be smaller as a distance between a sample in the current block and the samples adjacent to the top of the current block increases.

Preferably, the w1 may be set to be smaller as a distance between a sample in the current block and the samples adjacent to the left of the current block increases, and the w2 may be set to be smaller as a distance between a sample in the current block and the samples adjacent to the top of the current block increases, and when the intra prediction mode is the horizontal strong mode, a minimum value of the w1 may be set to be larger than a maximum value of the w2.

Preferably, the w1 may be set to be smaller as a distance between a sample in the current block and the samples adjacent to the left of the current block increases, and the w2 may be set to be smaller as a distance between a sample in the current block and the samples adjacent to the top of the current block increases, and when the intra prediction mode is the vertical strong mode, a minimum value of the w2 may be set to be larger than a maximum value of the w1.

Advantageous Effects

According to an embodiment of the present invention, the performance of the intra-picture prediction can be improved, and accordingly the image compression efficiency can be increased by using a new intra-picture prediction mode that can more strongly reflect characteristics in a horizontal direction or a vertical direction.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention is applied and is a diagram illustrating an intra-prediction method.

FIG. 6 illustrates a prediction direction according to an intra-prediction mode.

FIG. 7 is a diagram illustrating an intra prediction mode encoding method according to an embodiment of the present invention.

FIG. 8 illustrates an intra prediction mode decoding method according to an embodiment to which the present invention can be applied.

FIG. 9 illustrates a method for generating a prediction sample for a planar mode of 8×8 TU according to an embodiment to which the present invention can be applied.

FIG. 10 illustrates a vertical strong mode according to an embodiment of the present invention.

FIG. 11 illustrates a horizontal strong mode according to an embodiment of the present invention.

FIG. 12 is a diagram illustrating a method of determining a weighting vale in a vertical strong mode and a horizontal strong mode according to an embodiment of the present invention.

FIG. 13 is a diagram illustrating a method of determining a weighting value in a vertical strong mode according to an embodiment of the present invention.

FIG. 14 is a diagram illustrating a method of determining a weighting value in a horizontal strong mode according to an embodiment of the present invention.

FIG. 15 illustrates an intra prediction mode according to an embodiment of the present invention.

FIG. 16 illustrates an intra prediction mode according to an embodiment of the present invention.

FIG. 17 is a diagram illustrating an intra prediction method according to an embodiment of the present invention.

FIG. 18 illustrates a more specific example of an intra prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, block or 'unit' in this specification means a unit in which encoding/decoding processes such as prediction, conversion and/or quantization are performed, and may be composed of a multi-dimensional array of samples (or pixels).

The block or 'unit' may mean a multi-dimensional array of samples for luma components, or a multi-dimensional array of samples for chroma components. In addition, it may be collectively referred to as including all the multi-dimensional array of samples for luma components, or the multi-dimensional array of samples for chroma components.

For example, the block or 'unit' may be interpreted to include all of a coding block (CB) which means an array of samples to be subject to encoding/decoding, a coding tree block (CTB) composed of a plurality of coding blocks, a prediction block (PB) (or prediction unit (PU)) which means an array of samples to which the same prediction is applied, and a transform block (TB) (or a transform unit (TU)) which means an array of samples to which the same transformation is applied.

Unless otherwise described in this specification, the block or 'unit' may be interpreted to include a syntax structure used in encoding/decoding an array of samples for luma components and/or chroma components. Here, a syntax structure means zero or more syntax elements existing in a bitstream in a specific order, and the syntax element means an element of data represented in the bitstream.

For example, the block or 'unit' may be interpreted to include all of a coding unit (CU) including the coding block (CB) and a syntax structure used for encoding the corresponding coding block (CB), a coding tree unit (CU) composed of a plurality of coding units, a prediction unit (PU) including the prediction block PB and a syntax structure used for prediction of the corresponding prediction block PB, and a transform unit (TU) including the transform block (TB) and a syntax structure used for transforming the corresponding transform block (TB).

In addition, the block or 'unit' in this specification is not necessarily limited to an array of samples (or pixels) in the form of a square or a rectangle, and may mean an array of polygonal samples (or pixels) having three or more vertices. In this case, it may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(*b*), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra Prediction

FIG. 5 is an embodiment to which the present invention is applied and is a diagram illustrating an intra-prediction method.

Referring to FIG. 5, the decoder derives an intra-prediction mode of a current processing block (S501).

An intra-prediction mode may have a prediction direction for the location of a reference sample used for prediction depending on a prediction mode. An intra-prediction mode having a prediction direction is called an intra-angular prediction mode (Intra_Angular prediction mode). In contrast, an intra-prediction mode not having a prediction direction includes an intra-planar (INTRA_PLANAR) prediction mode and an intra-DC (INTRA_DC) prediction mode.

Table 1 illustrates intra-prediction modes and associated names, and FIG. 6 illustrates a prediction direction according to an intra-prediction mode.

TABLE 1

| (Intra prediction mode) | Associated name |
|---|---|
| 0 | INTRA_PLANAR |
| 1 | INTRA_DC |
| 2 . . . 34 | (INTRA_ANGULAR2 . . . INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nSxnS size, a total of 2xnS samples neighboring a bottom left of the current processing block, a sample neighboring the top boundary of the current processing block, a total of 2xnS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method of the reference samples may be determined based on a filtering flag transferred by the encoder.

The decoder generates a prediction block for the current processing block based on the intra-prediction mode and the reference samples (S504). That is, the decoder generates a prediction block (i.e., generates a prediction sample) for the current processing block based on the intra-prediction mode derived in the step S501 of deriving an intra-prediction mode and the reference samples obtained through the reference sample construction step S502 and the reference sample filtering step S503.

If the current processing block has been encoded in the INTRA_DC mode, in order to minimize the discontinuity of a boundary between processing blocks, a sample at the left boundary of a prediction block (i.e., a sample within a prediction block neighboring the left boundary) and a sample at the top boundary of the prediction block (i.e., a sample within a prediction block neighboring the top boundary) may be filtered at step S504.

Furthermore, at step S504, with respect to the vertical mode and horizontal mode of intra-angular prediction modes, as in the INTRA_DC mode, filtering may be applied to the left boundary sample or the top boundary sample.

This is described in more detail. If a current processing block has been encoded in the vertical mode or horizontal mode, the value of a prediction sample may be derived based on a reference sample located in a prediction direction. In this case, a boundary sample that belongs to the left boundary sample and top boundary sample of a prediction block and that is not located in the prediction direction may neighbor a reference sample not used for prediction. That is, the distance from the reference sample not used for prediction may be much closer than the distance from a reference sample used for prediction.

Accordingly, the decoder may adaptively apply filtering to left boundary samples or top boundary samples depending on whether an intra-prediction direction is vertical or horizontal. That is, if the intra-prediction direction is vertical, the decoder may apply filtering to the left boundary samples. If the intra-prediction direction is horizontal, the decoder may apply filtering to the top boundary samples.

FIG. 7 is a diagram illustrating an intra prediction mode encoding method according to an embodiment of the present invention.

1. If a neighboring block is intra-coded first, an encoder may derive intra prediction mode information of the neighboring block.

2. The encoder lists up most probable modes (MPM) candidates (or MPM lists) using the intra prediction mode information of the neighboring block.

In intra-picture coding, loss of overlapping information is prevented by considering similarity between the neighboring block and a current coding block, thereby increasing the coding efficiency. This method may also be used for encoding mode information transmission, which is referred to as most probable modes (MPM).

Since the neighboring block is located in the immediate vicinity of the current block, there is a high probability that intra prediction modes are similar to each other. Therefore, a current encoding mode may be expressed using a mode of the neighboring block.

At this time, the neighboring block may utilize a block adjacent to a left most likely to be used in decoding the current block (which is most likely to be already decoded), a block adjacent to a top-left, a block adjacent to a bottom-left, a block adjacent to a top, a block adjacent to a top-right, etc.

If the MPM is not satisfied using three MPMs in an existing 35 intra prediction modes, an intra-picture prediction mode is encoded using 5 bits (35−3=32).

At this time, if the intra prediction mode of the block adjacent to the left and the intra prediction mode of the block adjacent to the top are not the same, a first MPM candidate may be determined as the intra prediction mode of the block adjacent to the left, a second MPM candidate may be determined as the intra prediction mode of the block adjacent to the top, a third MPM candidate may be determined as one of a planar mode, a DC mode, or an intra vertical mode.

If the intra prediction mode of the block adjacent to the left and the intra prediction mode of the block adjacent to the top are the same, and if the corresponding overlapping mode is less than 2 (i.e., the planar mode or the DC mode, see Table 1), the first MPM candidate may be determined as the planar mode, the second MPM candidate may be determined as the DC mode, the third MPM candidate may be determined as the vertical mode (e.g., mode 26 in FIG. 6).

If the intra prediction mode of the block adjacent to the left and the intra prediction mode of the block adjacent to the top are the same, and if the corresponding overlapping mode is not less than 2, the first MPM candidate may be determined as an overlapping intra prediction mode, the second MPM candidate and the third MPM candidate may be determined as two modes adjacent to the overlapping intra prediction mode.

3. The encoder determines whether the best intra prediction mode to be applied to the current block belongs to the MPM candidate constructed as described above.

4. If the intra prediction mode of the current block belongs to the MPM candidate, the encoder codes an MPM flag and an MPM index.

Here, the MPM flag may indicate whether the intra prediction mode of the current block is derived from a neighboring intra prediction block (i.e., the intra prediction mode of the current block belongs to the MPM).

In addition, the MPM index may indicate which MPM mode is applied as the intra prediction mode of the current block among the MPM candidates constructed in step 2 above.

5. On the other hand, if the intra prediction mode of the current block does not belong to the MPM candidate, the encoder codes the intra prediction mode of the current block.

FIG. 8 illustrates an intra prediction mode decoding method according to an embodiment to which the present invention can be applied.

1. A decoder parses an MPM flag.

2. The decoder parses the MPM flag to confirm whether MPM encoding is applied to a current block.

That is, the decoder confirms whether the intra prediction mode of the current block belongs to the MPM candidate composed of the mode of the intra-predicted block of the neighboring block.

3. If MPM encoding is applied to the current block, the decoder parses an MPM index.

4. The decoder may then restore the MPM mode indicated by the MPM index to the intra prediction mode for the current block.

5. On the other hand, if the MPM encoding is not applied to the current block, the decoder parses the intra prediction mode for the current block.

As described above, prediction blocks of the current block are generated by using 33 directional prediction methods, two non-directional prediction methods, and a total of 35 prediction methods for intra-picture prediction in the HEVC.

In the case of 33 directional prediction modes, when calculating prediction samples from reference samples, reference sample values are copied into corresponding prediction samples in consideration of each directionality.

In other words, the 33 directional prediction methods generate the prediction samples using neighboring reference samples (top reference samples and left reference samples) to predict the current block, and then copy the generated prediction samples according to the prediction directionality.

On the other hand, in the case of a DC mode and a planar mode, which are the two non-directional prediction methods, the prediction samples are calculated by an average value and a weighted sum of the neighboring reference samples, respectively.

FIG. 9 illustrates a method for generating a prediction sample for a planar mode of 8×8 TU according to an embodiment to which the present invention can be applied.

Equation 1 below expresses an equation for generating a prediction sample in a planar mode.

$$\text{predSamples } [x][y]=((nT-1-x)*p[-1][y]+(x+1)*p[nT][-1]+(nT-1-y)*p[x][-1]+(y+1)*p[-1][nT]+nT)>>(\text{Log2}(nT)+1) \quad \text{[Equation 1]}$$

In Equation 1, nT represents a size of transformation unit TU.

Referring to FIG. 9 and Equation 1, a value of a current sample 'C' (predSamples [x] [y]) is determined by a weighted sum of reference sample 'O' (p[−1][y]) and reference sample T(p[nT][−1]), a weighted sum of reference sample 'E' (p[x][−1]) and reference sample 'S' (p [−1][nT]), and a right-shifted value of two's complement integer of a sum of nT by a binary digit of Log2(nT)+1.

Encoding/Decoding Method Using Intra Prediction Mode

In the case of the 33 directional prediction methods, a prediction sample is generated from one or two reference samples and copied to generate a prediction block. In addition, in the case of two non-directional prediction methods, a prediction sample is generated by an average value of neighboring reference samples and a weighted sum of neighboring reference samples, and a prediction block is generated using the prediction sample.

Therefore, in the case of the directional prediction method, since a limited reference sample is used, there is a disadvantage that a local prediction block is generated, and in the case of the non-directional prediction method, since all the neighboring reference samples of the current block are used, but since the prediction block is generated with the average value and a general weighting value, there is a disadvantage that characteristics of the neighboring reference sample are not reflected.

Accordingly, the present invention proposes a new vertical strong mode and a new horizontal strong mode in order to solve this problem.

Hereinafter, two new intra-picture prediction modes will be referred to as a vertical strong mode and a horizontal strong mode for convenience of explanation, but the present invention is not limited to this name.

Hereinafter, in the description of the present invention, a linear interpolation value (that is, $(nT-1-y)*p[x][-1]+(y+1)*p[-1][nT]$) is referred to as a 'vertical direction' or a 'vertical direction component' using top reference samples A-H and bottom-left sample S in Equation 1 for generating the prediction sample in the planar mode above.

In addition, a linear interpolation value (that is, $(nT-1-x)*p[-1][y]+(x+1)*p[nT][-1]$) is referred to as a 'horizontal direction' or a 'horizontal direction component' using left reference samples K-R and top-right sample I in Equation 1 above.

FIG. 10 illustrates a vertical strong mode according to an embodiment of the present invention.

Referring to FIG. 10, a vertical strong mode generates a prediction block using all the left reference samples K-R and the top reference samples A-H and the top-right sample I and the bottom-left sample S in the same manner as the planar mode of FIG. 9.

However, unlike the existing planar mode, which uses weighted sum depending on a distance, when generating the prediction block, the vertical strong mode calculates a weighted sum by assigning more weighting values in a vertical direction. That is, the vertical strong mode applies a larger weighting value to the vertical direction component than the horizontal direction component, and then generates a prediction sample by the weighted sum of the vertical direction component and the horizontal direction component.

FIG. 11 illustrates a horizontal strong mode according to an embodiment of the present invention.

Referring to FIG. 11, a horizontal strong mode generates a prediction block using all the left reference samples K-R and the top reference samples A-H and the top-right sample I and the bottom-left sample S in the same manner as the planar mode of FIG. 9.

However, the prediction block is generated using a method different from the existing planar mode. While the vertical strong mode of FIG. 10 calculates a weighted sum by assigning more weighting values in the vertical direction, the horizontal strong mode of FIG. 11 calculates a weighted sum by assigning more weighting values in the horizontal direction.

That is, the horizontal strong mode applies a larger weight to the horizontal direction component than the vertical direction component, and then generates a prediction sample by the weighted sum of the vertical direction component and the horizontal direction component.

In the above-described vertical strong mode of FIG. 10 and horizontal strong mode of FIG. 11, a method of assigning a weighting value may use the following various methods.

1) A method of assigning more weighting values in a vertical direction or a horizontal direction collectively Referring back to Equation 1, in the existing planar mode, a weighting value is assigned depending on a distance between a sample to be predicted currently and each reference sample, and a prediction value is generated by the weighted sum of the weighting value.

In the vertical or horizontal strong mode according to the present invention, a weighting value is assigned depending on a distance between a sample to be predicted currently and each reference sample, as in the planar mode. Then, the weighting value is assigned to the samples in the vertical direction and/or the horizontal direction, and more weighting values are assigned to the samples in the vertical direction or the horizontal direction. Then, a prediction value is generated by the weighted sum of these values.

Equation 2 below is an equation for generating prediction samples in the vertical strong mode and the horizontal strong mode.

$$predSamples[x][y]=(w1((nT-1-x)*p[-1][y]+(x+1)*p[nT][-1])+w2*((nT-1-y)*p[x][-1]+(y+1)*p[-1][nT])+nT+(w1+w2)>>1) >>((Log2(nT)+1)+(w1+w2))$$ [Equation 2]

where w1 and w2 are weighting values for the horizontal direction component and the vertical direction component, respectively. In the case of the vertical strong mode, w2>w1, and in the case of the horizontal strong mode, w2<w1.

2) A method of assigning different weights depending on a distance from the reference sample, respectively As in 1) above, a method of assigning more weighting values to the vertical direction or the horizontal direction collectively applies a predetermined weighting value (w1 and w2) to the vertical strong mode and the horizontal strong mode, respectively.

On the other hand, a method of assigning different weighting values depending on the distance from the reference sample is a method of variably adjusting the weighting values (w 1 and w 2) depending on the distance between the reference sample and the current sample.

The weighting values (w1 and w2) depending on the distance from the reference sample may be determined using various methods.

a) First, a first method of determining the weighting values w1 and w2 depending on the distance from the reference sample will be described with reference to the following drawings.

FIG. 12 is a diagram illustrating a method of determining a weighting vale in a vertical strong mode and a horizontal strong mode according to an embodiment of the present invention.

FIG. 12(a) shows a method of determining a weighting value in the vertical strong mode.

Referring to FIG. 12(a), in the case of the vertical strong mode, top reference samples A-H are more correlated than left reference samples K-R in predicting a current sample C. Thus, it is efficient to assign more weighting values to the top reference samples.

For example, a weighting value (i.e., a weighting value applied to the vertical direction component) w2 related to the top reference samples may be set to 3 and a weighting value (i.e., a weighting value applied to the horizontal direction component) w1 related to the left reference samples may be set to 1. However, this is only one example, and the assigned weighting value may be assigned to any other weighting value.

However, as shown in FIG. 12(a), as a position of a sample to be predicted currently is moved away from the top reference samples, the accuracy decreases. Therefore, when the sample to be predicted currently is located in the region B, the weighting value of w2 may be reduced and it is reflected.

For example, if the sample to be predicted currently is located in the region A, the weighting value of w2 may be set to 3, and when the sample is located in the region B, the weighting value of w2 may be set to 1. However, this is only one example, and the assigned weighting value may be assigned to any other weighting value.

In FIG. 12(a), for convenience of description, only the regions A and B in the current block are illustrated, but the present invention is not limited thereto.

More specifically, in the case of the vertical strong mode, the current block may be divided into n regions in the vertical direction. For example, when the current block is 2N×2N, it can be divided into n regions of 2N×(2N/n). Alternatively, the height of each region may be different. For example, when the current block is 2N×2N, each region may be divided into 2N×h_1, 2N×h_2, . . . , 2N×h_n. The value of the weighting value w2 applied to the vertical direction component may be determined depending on which region the sample to be predicted currently is located in. As described above, the value of the weighting value w2 applied to the vertical direction component may be set to be smaller as a distance between the sample to be predicted currently (or the region to which the sample belongs) and the top reference samples of the current block increases.

FIG. 12(b) shows a method of determining a weighting value in the horizontal strong mode.

Referring to FIG. 12(b), in the case of the horizontal strong mode, left reference samples K-R are more correlated than top reference samples A-H in predicting a current sample C. Thus, it is efficient to assign more weighting values to the left reference samples.

For example, a weighting value (i.e., a weighting value applied to the vertical direction component) w2 related to the top reference samples may be set to 1 and a weighting value (i.e., a weighting value applied to the horizontal direction component) w1 related to the left reference samples may be set to 3. However, this is only one example, and the assigned weighting value may be assigned to any other weighting value.

However, as shown in FIG. 12(b), as a position of a sample to be predicted currently is moved away from the left reference samples, the accuracy decreases. Therefore, when the sample to be predicted currently is located in the region B, the weighting value of w1 may be reduced and it is reflected.

For example, if the sample to be predicted currently is located in the region A, the weighting value of w1 may be set to 3, and when the sample is located in the region B, the weighting value of w1 may be set to 1. However, this is only one example, and the assigned weighting value may be assigned to any other weighting value.

In FIG. 12(b), for convenience of description, only the regions A and B in the current block are illustrated, but the present invention is not limited thereto.

More specifically, in the case of the horizontal strong mode, the current block may be divided into n regions in the horizontal direction. For example, when the current block is 2N×2N, it may be divided into n regions of (2N/n)×2N. Alternatively, the width of each region may be different. For example, when the current block is 2N×2N, each region may be divided into w_1×2N, w_2×2N, . . . , w_n×2N. The value of the weighting value w1 applied to the horizontal direction component may be determined depending on which region the sample to be predicted currently is located in. As described above, the value of the weighting value w1 applied to the horizontal direction component may be set to be smaller as a distance between the sample to be predicted currently (or the region to which the sample belongs) and the left reference samples of the current block increases.

b) Next, a second method of determining the weighting values w1 and w2 depending on the distance from the reference sample will be described with reference to the following drawings.

FIG. 13 is a diagram illustrating a method of determining a weighting value in a vertical strong mode according to an embodiment of the present invention.

Referring to FIG. 13, in the case of the weighting value (i.e., the weighting value applied to the vertical direction component) w2 related to the top reference samples in the vertical strong mode, a relatively large weighting value may be assigned to region A depending on a distance from the top reference samples and a relatively small weighting value may be assigned to region B. In the case of the weighting value (i.e., the weighting value applied to the horizontal direction component) w1 related to the left reference samples, a relatively large weighting value may be assigned to region C depending on a distance from the left reference samples and a relatively small weighting value may be assigned to region D.

However, since the current mode is the vertical strong mode, as shown in FIG. 13, a weighting value greater than the weighting value (i.e., the weight value applied to the horizontal direction component) w1 related to the left reference samples may be assigned to the weighting value (i.e., the weight value applied to the vertical direction component) w2 related to the top reference samples as a whole. That is, the weighting value w2 of the region B may be set to a value greater than the weighting value w1 of the region C.

In FIG. 13, for convenience of explanation, only the regions A and B in the current block are illustrated with respect to the weighting value applied to the vertical direction component, and only the regions C and D in the current block are illustrated with respect to the weighting value applied to the horizontal direction component. However, the present invention is not limited thereto.

More specifically, the current block may be divided into n regions in the vertical direction. For example, when the current block is 2N×2N, it may be divided into n regions of 2N×(2N/n). Alternatively, the height of each region may be different. For example, when the current block is 2N×2N, each region may be divided into 2N×h_1, 2N×h_2, 2N×h_n. The value of the weighting value w2 applied to the vertical direction component may be determined depending on which region the sample to be predicted currently is located in. As described above, the value of the weighting value w2 applied to the vertical direction component may be set to be smaller as a distance between the sample to be predicted currently (or the region to which the sample belongs) and the top reference samples of the current block increases.

Similarly, the current block may be divided into n regions in the horizontal direction. For example, when the current block is 2N×2N, it may be divided into n regions of (2N/n)×2N. Alternatively, the width of each region may be different. For example, when the current block is 2N×2N, each region may be divided into w_1 ×2N, w_2×2N, ..., w_n×2N. The value of the weighting value w1 applied to the horizontal direction component may be determined depending on which region the sample to be predicted currently is located in. As described above, the value of the weighting value w1 applied to the horizontal direction component may be set to be smaller as a distance between the sample to be predicted currently (or the region to which the sample belongs) and the left reference samples of the current block increases.

In addition, in the case of the vertical strong mode, a minimum value (i.e., a weighting value assigned to a region farthest from the top reference samples) among the weighting values w2 applied to the vertical direction component may be set to be larger than a maximum value (i.e., a weighting value assigned to a region closest to the left reference samples) among the weighting values w1 applied to the horizontal direction component.

FIG. 14 is a diagram illustrating a method of determining a weighting value in a horizontal strong mode according to an embodiment of the present invention.

Referring to FIG. 14, in the case of the weighting value (i.e., the weighting value applied to the horizontal direction component) w1 related to the left reference samples in the horizontal strong mode, a relatively large weighting value may be assigned to region A depending on a distance from the left reference samples and a relatively small weighting value may be assigned to region B. In the case of the weighting value (i.e., the weighting value applied to the vertical direction component) w2 related to the top reference samples, a relatively large weighting value may be assigned to region C depending on a distance from the top reference samples and a relatively small weighting value may be assigned to region D.

However, since the current mode is the horizontal strong mode, as shown in FIG. 14, a weighting value greater than the weighting value (i.e., the weight value applied to the vertical direction component) w2 related to the top reference samples may be assigned to the weighting value (i.e., the weight value applied to the horizontal direction component) w1 related to the left reference samples as a whole. That is, the weighting value w1 of the region B may be set to a value greater than the weighting value w2 of the region C.

In FIG. 14, for convenience of explanation, only the regions A and B in the current block are illustrated with respect to the weighting value applied to the horizontal direction component, and only the regions C and D in the current block are illustrated with respect to the weighting value applied to the vertical direction component. However, the present invention is not limited thereto.

More specifically, the current block may be divided into n regions in the horizontal direction. For example, when the current block is 2N×2N, it may be divided into n regions of (2N/n)×2N. Alternatively, the width of each region may be different. For example, when the current block is 2N×2N, each region may be divided into w_1×2N, w_2×2N, ..., w_n×2N. The value of the weighting value w1 applied to the horizontal direction component may be determined depending on which region the sample to be predicted currently is located in. As described above, the value of the weighting value w1 applied to the horizontal direction component may be set to be smaller as a distance between the sample to be predicted currently (or the region to which the sample belongs) and the left reference samples of the current block increases.

Similarly, the current block may be divided into n regions in the vertical direction. For example, when the current block is 2N×2N, it may be divided into n regions of 2N×(2N/n). Alternatively, the height of each region may be different. For example, when the current block is 2N×2N, each region may be divided into 2N×h_1, 2N×h_2, ..., 2N×h_n. The value of the weighting value w2 applied to the vertical direction component may be determined depending on which region the sample to be predicted currently is located in. As described above, the value of the weighting value w2 applied to the vertical direction component may be set to be smaller as a distance between the sample to be predicted currently (or the region to which the sample belongs) and the top reference samples of the current block increases.

In addition, in the case of the horizontal strong mode, a minimum value (i.e., a weighting value assigned to a region farthest from the left reference samples) among the weighting values w1 applied to the horizontal direction component may be set to be larger than a maximum value (i.e., a weighting value assigned to a region closest to the top reference samples) among the weighting values w2 applied to the vertical direction component.

As described above, the above-described vertical strong mode and horizontal strong mode generate prediction blocks using neighboring reference sample values similar to the existing planar mode, however, the prediction performance can be improved by generating prediction blocks by more strongly reflecting characteristics in the vertical and horizontal directions, respectively.

In addition, the present invention proposes a method of applying the above-described vertical strong mode and horizontal strong mode to intra-picture prediction encoding/decoding. The method of applying the new two modes to intra-picture prediction encoding/decoding may be defined in two ways.

A method of substituting the existing mode
A method of adding a new mode to the existing mode
A detailed description of each method is as follows.
1) A method of substituting the existing mode
The HEVC has a total of 35 modes, 33 directional modes and 2 non-directional modes.

The new vertical strong mode and horizontal strong mode proposed in the present invention may be substituted with any two of the existing 33 directional modes.

FIG. 15 illustrates an intra prediction mode according to an embodiment of the present invention.

FIG. 15 illustrates a case in which the vertical strong mode and the horizontal strong mode are substituted instead of mode 3 and mode 33 in the existing intra-picture prediction mode direction.

As shown in FIG. 15, for example, if the frequency of occurrence of the mode 3 and the mode 33 is low among the 33 directional modes, the vertical strong mode and the horizontal strong mode may be used instead of the two intra modes. That is, the existing two directional modes are substituted with the vertical strong mode and the horizontal strong mode, respectively, however, the directionality of the intra mode (mode 3 and mode 33 in FIG. 15) to be substituted does not apply to the vertical strong mode and the horizontal strong mode.

In this way, when the two directional intra prediction modes are substituted, a total of 35 intra prediction modes are defined by substituting the specific two directional intra prediction modes with the vertical strong mode and the horizontal strong mode, and the same may be used for all the blocks.

Alternatively, two directional intra prediction modes that are substituted with the vertical strong mode and the horizontal strong mode in units of picture/slice/block may be set differently (that is, independently). In this case, two substituted directional intra prediction modes may be signaled from an encoder to a decoder. In other words, it is the same that a total of 35 intra prediction modes are used for all picture/slice/block by substituting the two directional intra prediction modes with the vertical strong mode and the horizontal strong mode, however, the two directional intra prediction modes that are substituted with the vertical strong mode and the horizontal strong mode in units of picture/slice/block may be set differently (i.e., independently).

In the above example, the mode 3 and the mode 33, which are substituted with the vertical strong mode and the horizontal strong mode, are merely examples, and it goes without saying that the other directional modes can be substituted with the vertical strong mode and the horizontal strong mode.

In this case, since the existing intra mode is substituted with the horizontal strong mode and the vertical strong mode, the most probable mode (MPM) and intra-picture intra mode encoding method can be applied in the same manner as the existing method.

2) A method of adding a new mode to the existing mode

Since the method of substituting the existing mode described in the above 1) substitutes any two modes having the existing directionality with the horizontal strong mode and the vertical strong mode proposed in the present invention, the existing two directional modes substituted with the new mode can not be used.

To solve this problem, a method of adding a new mode to the existing mode is proposed.

This method generates a total of 37 modes (35 existing intra mode+horizontal strong mode+vertical strong mode) by adding newly horizontal strong mode and vertical strong mode to the existing intra mode. For example, the existing directional mode can be used as it is, by adding the two new modes to the non-directional mode, and the number of non-directional modes can be increased to four.

FIG. 16 illustrates an intra prediction mode according to an embodiment of the present invention.

As shown in FIG. 16, a new horizontal strong mode and a new vertical strong mode proposed in the present invention may be regarded as a non-directional mode, and they may be located in front of 33 directional modes as in the existing planar mode and DC mode. For example, the intra prediction modes 0 to 3 may indicate planar, DC, horizontal strong mode, and vertical strong mode in order, and the intra prediction modes 4 to 36 may indicate the existing 33 directional modes (modes 2 to 34) in order.

Alternatively, the vertical strong mode and the horizontal strong mode may be added between the existing directional modes.

When the horizontal strong mode and the vertical strong mode are added to the existing intra prediction mode as described above, it is desirable to change the intra-picture prediction mode encoding/decoding method such as most probable mode (MPM).

In the method proposed in the present invention, since the number of intra-picture prediction modes is increased to 37, if the MPM is not satisfied using the existing 3 MPM, the intra-picture prediction mode can not be encoded with 5 bits (37−3=34). Therefore, in this case, it is desirable to efficiently encode the intra-picture prediction mode by increasing the number of MPMs.

Since the method proposed in the present invention adds two new modes (a horizontal strong mode and a vertical strong mode) to the existing 35 modes and uses a total of 37 intra-picture prediction modes, if the MPM is not satisfied, 5 MPM should be used in order to encode the intra-picture prediction mode using the existing 5 bits (37−5=32). Therefore, in the method of adding the new mode to the existing mode, the horizontal strong mode and the vertical strong mode are added as the non-directional mode, and the number of MPMs is increased by two, so that a total of 5 MPM can be used. At this time, the method of determining a first MPM candidate to a third MPM candidate may be the same as the method described in FIG. 7.

FIG. 17 is a diagram illustrating an intra prediction method according to an embodiment of the present invention.

Referring to FIG. 17, a decoder derives an intra prediction mode of a current block (S1701).

As described above, the intra prediction mode may have a prediction direction with respect to a position of a reference sample used for prediction according to the prediction mode, and may not be directional.

As described above, when a vertical strong mode and a horizontal strong mode according to the present invention are defined as a new intra prediction mode, some of 35 intra prediction modes of the existing HEVC may be substituted or an additional intra prediction mode may be defined to indicate the vertical strong mode and the horizontal strong mode.

The decoder constructs reference samples to be used for predicting the current block (S1702).

In intra prediction, neighboring samples of the current block may mean a sample adjacent to the left boundary of the current block of size nS×nS and a total of 2×nS samples adjacent to the bottom-left, a sample adjacent to the top boundary of the current block and a total of 2×nS samples adjacent to the top-right, and one sample adjacent to the top-left of the current block.

At this time, some of the neighboring samples of the current block may not yet be decoded or may not be available. In this case, the decoder may substitute the samples that are not available with available samples to construct the reference samples for use in prediction.

In addition, the decoder may perform filtering of the reference sample based on the intra prediction mode. Whether or not the filtering of the reference sample is performed may be determined based on the size of the current block. In addition, the filtering method of the reference sample may be determined by a filtering flag transmitted from an encoder.

The decoder generates a prediction sample for the current block using the reference sample (S1703).

Here, when the intra prediction mode is the vertical strong mode or the horizontal strong mode, the decoder can generate a prediction sample using a reference sample ($p[x][-1]$ in Equation 2 above) having the same x-coordinate as the current sample, a reference sample ($p[-1][y]$ in Equation 2 above) having the same y-coordinate as the current sample, a reference sample ($p[-1][nT]$ in Equation 2 above) adjacent to the bottom-left of the current block, and a reference sample ($p[nT][-1]$ in Equation 2 above) adjacent to the top-right of the current block among the reference samples constructed in step S1702 for each sample in the current block.

The decoder may set a weighting value w1 applied to the reference sample having the same y-coordinate as the current sample and the reference sample adjacent to the top-right of the current block and a weighting value w2 applied to the reference sample having the same x-coordinate as the sample and the reference sample adjacent to the bottom-left of the current block to be different from each other.

When the intra prediction mode is the horizontal strong mode, the w1 may be set to be larger than the w2. On the other hand, when the intra prediction mode is the vertical strong mode, the w2 may be set to be larger than the w1.

At this time, the w1 and w2 may be set to the same value for all the samples in the current block, as in the above method 1) (a method of assigning more weighting values to the vertical or horizontal direction collectively).

Alternatively, the w1 may be set to be smaller as a distance between a current sample and the samples adjacent to the left of the current block increases, as in the above method 2) (a method of assigning a different weighting value depending on a distance from a reference sample). In addition, the w2 may be set to be smaller as a distance between a current sample and the samples adjacent to the top of the current block increases.

At this time, when the intra prediction mode is the horizontal strong mode, a minimum value of the w1 may be set to be larger than a maximum value of the w2. On the other hand, when the intra prediction mode is the vertical strong mode, a minimum value of the w2 may be set to be larger than a maximum value of the w1.

FIG. 18 illustrates a more specific example of an intra prediction unit according to an embodiment of the present invention.

Although an intra prediction unit (182; see FIG. 1, 262; see FIG. 2) is shown as one block in FIG. 18 for convenience of explanation, the intra prediction unit 182 and 262 may be implemented by a configuration included in an encoder and/or a decoder.

Referring to FIG. 18, the intra prediction unit 182 and 262 implement the functions, processes, and/or methods proposed in FIGS. 5 to 17 previously. More specifically, the intra prediction unit 182 and 262 may include an intra prediction mode deriving unit 1801, a reference sample constructing unit 1802, and a prediction sample generator 1803.

The intra prediction mode deriving unit 1801 derives an intra prediction mode of a current block.

As described above, when a horizontal strong mode and a vertical strong mode are newly defined, some of 35 intra prediction modes of the existing HEVC may be substituted to indicate the horizontal strong mode and the vertical strong mode or an additional intra prediction mode may be defined to indicate the horizontal strong mode and the vertical strong mode.

The reference sample constructing unit 1802 constructs reference samples to be used for predicting the current block.

In intra prediction, neighboring samples of the current block may mean a sample adjacent to the left boundary of the current block of size nS×nS and a total of 2×nS samples adjacent to the bottom-left, a sample adjacent to the top boundary of the current block and a total of 2×nS samples adjacent to the top-right, and one sample adjacent to the top-left of the current block.

At this time, some of the neighboring samples of the current block may not yet be decoded or may not be available. In this case, the decoder may substitute the samples that are not available with available samples to construct the reference samples for use in prediction.

In addition, the decoder may perform filtering of the reference sample based on the intra prediction mode. Whether or not the filtering of the reference sample is performed may be determined based on the size of the current block. In addition, the filtering method of the reference sample may be determined by a filtering flag transmitted from an encoder.

The prediction sample generator 1803 generates a prediction sample for the current block using the reference sample.

Here, when the intra prediction mode is the vertical strong mode or the horizontal strong mode, the decoder can generate a prediction sample using a reference sample (p[x][−1] in Equation 2 above) having the same x-coordinate as the current sample, a reference sample (p[−1][y] in Equation 2 above) having the same y-coordinate as the current sample, a reference sample (p[−1][nT] in Equation 2 above) adjacent to the bottom-left of the current block, and a reference sample (p[nT][−1] in Equation 2 above) adjacent to the top-right of the current block among the reference samples constructed in step S1702 for each sample in the current block.

The prediction sample generator 1803 may set a weighting value w1 applied to the reference sample having the same y-coordinate as the current sample and the reference sample adjacent to the top-right of the current block and a weighting value w2 applied to the reference sample having the same x-coordinate as the sample and the reference sample adjacent to the bottom-left of the current block to be different from each other.

When the intra prediction mode is the horizontal strong mode, the w1 may be set to be larger than the w2. On the other hand, when the intra prediction mode is the vertical strong mode, the w2 may be set to be larger than the w1.

At this time, the w1 and w2 may be set to the same value for all the samples in the current block, as in the above method 1) (a method of assigning more weighting values to the vertical or horizontal direction collectively).

Alternatively, the w1 may be set to be smaller as a distance between a current sample and the samples adjacent to the left of the current block increases, as in the above method 2) (a method of assigning a different weighting value depending on a distance from a reference sample). In addition, the w2 may be set to be smaller as a distance between a current sample and the samples adjacent to the top of the current block increases.

At this time, when the intra prediction mode is the horizontal strong mode, a minimum value of the w1 may be set to be larger than a maximum value of the w2. On the other hand, when the intra prediction mode is the vertical strong mode, a minimum value of the w2 may be set to be larger than a maximum value of the w1.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The above-described preferred embodiments of the present invention have been disclosed for the purpose of illustration, and it will be apparent to those skilled in the art that various other embodiments may be modified, varied, substituted or added, and the like without departing from the technical sprit and technical scope of the present invention disclosed in the accompanying claims.

The invention claimed is:

1. A method for decoding an image by a decoding device, the method comprising:
deriving an intra prediction mode of a current block;
constructing reference samples with samples adjacent to an top of the current block and samples adjacent to a left of the current block; and
generating a prediction sample, when the intra prediction mode is a vertical/horizontal strong mode, using a reference sample having the same x-coordinate as the sample, a reference sample having the same y-coordinate as the sample, a reference sample adjacent to a bottom-left of the current block, and a reference sample adjacent to an top-right of the current block among the reference samples for each sample in the current block,
wherein a weighting value w1 applied to the reference sample having the same y-coordinate as the sample and the reference sample adjacent to the top-right of the current block and a weighting value w2 applied to the reference sample having the same x-coordinate as the sample and the reference sample adjacent to the bottom-left of the current block are set to be different from each other.

2. The method of claim 1, wherein when the intra prediction mode is the horizontal strong mode, the w1 is set to be larger than the w2.

3. The method of claim 1, wherein when the intra prediction mode is the vertical strong mode, the w2 is set to be larger than the w1.

4. The method of claim 1, wherein the w1 and the w2 are set to the same value for all samples in the current block.

5. The method of claim 1, wherein the w1 is set to be smaller as a distance between a sample in the current block and the samples adjacent to the left of the current increases.

6. The method of claim 1, wherein the w2 is set to be smaller as a distance between a sample in the current block and the samples adjacent to the top of the current block increases.

7. The method of claim 1, wherein the w1 is set to be smaller as a distance between a sample in the current block and the samples adjacent to the left of the current block increases, and the w2 is set to be smaller as a distance between a sample in the current block and the samples adjacent to the top of the current block increases, and
when the intra prediction mode is the horizontal strong mode, a minimum value of the w1 is set to be larger than a maximum value of the w2.

8. The method of claim 1, wherein the w1 is set to be smaller as a distance between a sample in the current block and the samples adjacent to the left of the current block increases, and the w2 is set to be smaller as a distance between a sample in the current block and the samples adjacent to the top of the current block increases, and
when the intra prediction mode is the vertical strong mode, a minimum value of the w2 is set to be larger than a maximum value of the w1.

9. A decoding device for decoding an image, the device comprising:
an intra prediction mode deriving unit configured to derive an intra prediction mode of a current block;
a reference sample constructing unit configured to construct reference samples with samples adjacent to an top of the current block and samples adjacent to a left of the current block; and
a prediction sample generator configured to generate a prediction sample, when the intra prediction mode is a vertical/horizontal strong mode, using a reference sample having the same x-coordinate as the sample, a reference sample having the same y-coordinate as the sample, a reference sample adjacent to a bottom-left of the current block, and a reference sample adjacent to an top-right of the current block among the reference samples for each sample in the current block,
wherein a weighting value w1 applied to the reference sample having the same y-coordinate as the sample and the reference sample adjacent to the top-right of the current block and a weighting value w2 applied to the reference sample having the same x-coordinate as the sample and the reference sample adjacent to the bottom-left of the current block are set to be different from each other.

* * * * *